United States Patent Office 2,885,408
Patented May 5, 1959

2,885,408

PRODUCTION OF ANHYDROENNEAHEPTITOL

Max O. Robeson, Corpus Christi, Tex., assignor to Celanese Corporation of America, New York, N.Y., a corporation of Delaware No Drawing. Application January 10, 1956
Serial No. 558,195

5 Claims. (Cl. 260—345.9)

This invention relates to the production of anhydroenneaheptitol and relates more particularly to an improved process for the production and recovery of anhydroenneaheptitol in high yields.

An important object of this invention is to provide a novel process for the production and recovery of anhydroenneaheptitol which may be carried out in a continuous manner.

A further object of this invention is to provide a novel process for the production and recovery of anhydroenneaheptitol in which no handling of solids is involved.

Other objects of this invention will be apparent from the following detailed description and claims.

Anhydroenneaheptitol can be made by the condensation in aqueous solution of acetone with formaldehyde in the presence of an alkaline condensing agent. During this reaction, presumably, six mols of formaldehyde condense with each mol of acetone to produce a product containing six hydroxymethyl groups. The carbonyl group is then reduced by a crossed Cannizzaro reaction and a stable pyran ring structure is formed by dehydration. The mixture obtained at the completion of the reaction contains, in addition to the anhydroenneaheptitol and water, a considerable proportion of the formate salt of the alkaline condensing agent, and excess reactants, usually excess alkaline condensing agent and formaldehyde. The recovery of the anhydroenneaheptitol from this mixture involves a number of problems owing to the difficulty in crystallizing the anhydroenneaheptitol and also to the tendency for further condensation reactions to occur. For example, the formaldehyde can condense with itself to form syrupy condensation products which are difficult to crystallize or otherwise remove from the reaction mixture.

According to this invention, anhydroenneaheptitol is prepared by the condensation of acetone with formaldehyde in the presence of an alkaline condensing agent. At the completion of the reaction, the pH of the reaction mixture is brought to less than 9.0, for example, between 5.5 and 9.0 or, preferably, between 6.0 and 8.5. If only a limited amount of alkaline condensing agent has been used, the pH of the reaction mixture may be in the range specified and no additions thereto may be necessary. If, on the other hand, larger amounts of alkaline condensing agent have been used, the pH of the reaction mixture may be higher than desired and will have to be reduced, for example, by the addition thereto of suitable amounts of an acid-reacting material such as formic acid, acetic acid or the like. Excess formaldehyde is then removed from the reaction mixture by distilling the same at atmospheric or superatmospheric pressure or by the use of a steam distillation.

The major impurity remaining in the reaction mixture is the formate of the alkaline condensing agent. The reaction mixture is advantageously treated at this point to bring its water concentration to beween 40 and 60% or, preferably, between 50 and 55% by weight. Since, normally, the reaction mixture sontains a larger proportion of water, the said mixture is evaporated to bring the concentration of water to the desired level. Thereafter, the reaction mixture is extracted with n-butanol or mixed amyl alcohols such as are commonly found in fusel oil. The mixed amyl alcohols should contain from 50 to 80% by weight of isoamyl alcohol, the rest being made up of the other isomeric amyl alcohols. The extractant should, preferably, contain a proportion of water ranging from 5% by weight up to the saturation point at room temperature (25° C.) since when a completely anhydrous extractant is employed, there is the danger that the formate of the alkaline condensing agent will precipitate in the extractor. For best results, this extraction should be carried out at a temperature between 50 and 90° C. or, preferably, between 70 and 80° C. For each part by weight of solution being extracted, there should be employed between 3 and 7 parts by weight, or, preferably, between 4 and 6 parts by weight of extractant. The extract containing anhydroenneaheptitol dissolved in the extractant also contains a small proporiton of the formate of the alkaline condensing agent. To reduce the proportion of the formate, it is desirable to wash the extract with water, in one or more stages, at a temperature between 50 and 90° C. or, preferably, between 70 and 80° C., employing for each part by weight of the original anhydroenneaheptitol feed stream between 0.1 and 0.6 or, preferably, between 0.4 and 0.6 part by weight of water.

The extraction and washing of the reaction mixture may advantageously be combined in a single operation, employing a suitable extractor such as a packed column. The extractant is introduced continuously into the column near the base thereof while the reaction mixture is introduced continuously into the column at a point above the point at which the extractant is introduced. The wash water is introduced into the column at a still higher point. The extractant flows upwardly through the column and overflows from the top thereof while the water flows downwardly and is removed from the base of the column. Advantageously, the column is operated so that the extractant comprises the continuous phase therein.

The extractant is then removed from the anhydroenneaheptitol in any suitable manner, for example, by first distilling off the major portion thereof. Thereafter, an excess of water above that required to form an azeotrope with all the remaining extractant is added and the azeotrope distilled from the anhydroenneaheptitol. There is obtained in this manner an aqueous solution of anhydroenneaheptitol containing only a small proportion of the formate of the alkaline condensing agent. Because all the operations in this process are carried out while the materials are in the liquid phase, the expense of such operations and the losses of products during the same may readily be held to a minimum.

The following example is given to illustrate this invention further.

*Example*

There are mixed together 10,000 parts by weight of 24.0% by weight aqueous formaldehyde, 592 parts by weight of 98.0% by weight acetone (the remaining 2% is water), and 2,000 parts by weight of water. To the solution so formed there is added rapidly a solution of 480 parts by weight of sodium hydroxide in 1960 parts by weight of water. The initial temperature of both solutions is 27° C. Reaction starts rapidly and the temperature reaches a maximum of 81° C. in 10 minutes. At the end of 80 minutes, the temperature drops to 70° C., the pH of the solution is 8.0 and the weight percent of formaldehyde is 2.48. The reaction mixture is diluted with an equal volume of water and distilled at atmospheric pressure to remove all the free formaldehyde. During this distillation, the feed is concentrated to one-half its original volume.

The residue from the distillation is evaporated until its boiling point reaches 105° C. at which time it contains 53.2% by weight of water. The concentrated material is then introduced through a sparger into a 12 foot column packed with ¼ inch Berl saddles at a point 8 feet from the bottom of the column at the rate of 390 parts by weight per hour. Simultaneously, there is introduced into the base of the column 2,140 parts by weight per hour of n-butanol saturated with water and into the top of the column 210 parts by weight per hour of water. The column temperature is held between 70 and 80° C. The extract is evaporated until its boiling point reaches 115° C. to remove the major portion of the butanol therefrom, mixed with 1 volume of water for each volume of concentrated material and evaporated again until its boiling point reaches 115° C. to remove the remainder of the n-butanol therefrom. The product obtained contains 16.7 weight percent of water and 2.2 weight percent of sodium formate. The anhydroenneaheptitol has a purity of 93% (corrected for water and sodium formate) as determined by hydroxyl content and is obtained in yields of 86% of theory based on the acetone and formaldehyde.

It is to be understood that the foregoing detailed description is merely given by way of illustration and that many variations may be made therein without departing from the spirit of my invention.

Having described my invention, what I desire to secure by Letters Patent is:

1. In a process for the production of anhydroenneaheptitol by the condensation of acetone and formaldehyde in the presence of sodium hydroxide, the steps which comprise adjusting the water content of the reaction mixture to between 50 and 55 weight percent, bringing the pH of the reaction mixture to between 6.0 and 8.5, distilling unreacted formaldehyde from the reaction mixture, extracting the reaction mixture with a member of the group consisting of n-butanol and mixed amyl alcohols saturated with water at room temperature at a temperature between 70 and 80° C., employing for each part by weight of reaction mixture between 4 and 6 parts by weight of extractant, and washing the extract with between 0.4 and 0.6 part by weight of water for each part by weight of the feed.

2. In a process for the production of anhydroenneaheptitol wherein by the condensation of acetone and formaldehyde in the presence of sodium hydroxide there is produced an aqueous solution of anhydroenneaheptitol and sodium formate in water, the step which comprises extracting said aqueous solution, at a water concentration of 40 to 60% by weight, with a solvent of the group consisting of n-butanol and mixed amyl alcohols, said solvent containing an amount of water between 5% by weight and the saturation point, to produce an extract comprising a solution of the anhydroenneaheptitol in said solvent and containing only a small proportion of the sodium formate and an aqueous liquid phase immiscible with said extract and recovering the anhydroenneaheptitol from said extract.

3. Process as set forth in claim 2 in which said solvent is saturated with water and the temperature of extraction is between 50 and 90° C.

4. Process as set forth in claim 2 in which said solvent is saturated with water, said solution contains 50–55% by weight of water, and the temperature of extraction is 70 to 80° C.

5. Process as set forth in claim 2 in which said extract is washed with water to reduce the proportion of sodium formate in said extract.

References Cited in the file of this patent

UNITED STATES PATENTS

| | | |
|---|---|---|
| 2,462,031 | Wittcoff | Feb. 15, 1949 |
| 2,470,964 | Wittcoff | May 24, 1949 |
| 2,493,733 | Wittcoff | Jan. 3, 1950 |
| 2,503,119 | McKinnis | Apr. 4, 1950 |
| 2,721,221 | Byron | Oct. 18, 1955 |